United States Patent [19]

Yishay et al.

[11] Patent Number: 5,257,357
[45] Date of Patent: Oct. 26, 1993

[54] METHOD AND APPARATUS FOR IMPLEMENTING A PRIORITY ADJUSTMENT OF AN INTERRUPT IN A DATA PROCESSOR

[75] Inventors: Oded Yishay; Eytan Hartung, both of Austin, Tex.; David Shamir, Tel-Aviv, Israel

[73] Assignee: Motorola, Inc., Schaumburg, Ill.

[21] Appl. No.: 644,142

[22] Filed: Jan. 22, 1991

[51] Int. Cl.$^5$ .................. G06F 13/00; G06F 13/24
[52] U.S. Cl. ................... 395/725; 364/241.4; 364/DIG. 1; 364/941.6; 364/DIG. 2
[58] Field of Search ............ 395/725, 325, 275; 364/241.4, DIG. 1, 941.6, DIG. 2

[56] References Cited

U.S. PATENT DOCUMENTS

| | | | |
|---|---|---|---|
| 3,925,766 | 12/1975 | Bardotti et al. | 364/200 |
| 3,984,820 | 10/1976 | Stanley et al. | 395/725 |
| 4,493,036 | 1/1985 | Boudreau et al. | 395/725 |
| 4,788,640 | 11/1988 | Hansen | 395/425 |
| 4,829,467 | 5/1989 | Ogata | 364/900 |
| 4,914,580 | 4/1990 | Jensen et al. | 395/325 |
| 4,953,081 | 8/1990 | Feal et al. | 395/325 |
| 5,083,261 | 1/1992 | Wilkie | 395/725 |

Primary Examiner—Michael R. Fleming
Assistant Examiner—Glenn A. Auve
Attorney, Agent, or Firm—Elizabeth A. Apperley

[57] ABSTRACT

An interrupt mechanism allows an interrupt request signal to be adjusted to any priority level specified by the user and provides to a CPU an encoded interrupt signal which either indicates that the interrupt priority has been adjusted or identifies a highest prioritized interrupt request when no adjustment in priority is made. A first logic circuit functions to receive a priority adjust request signal and compares the adjust signal with one or more interrupt signals to determine if an adjustment is required. A second logic circuit functions to identify the highest prioritized interrupt request of a plurality of interrupt requests and provides the encoded interrupt signal in response thereto. In one form, the encoded interrupt signal is translated into a value for use in a software exception processing routine within the CPU. The software exception processing routine can perform a variety of user specified functions with the encoded adjusted priority interrupt signal.

13 Claims, 3 Drawing Sheets 5,257,357

METHOD AND APPARATUS FOR IMPLEMENTING A PRIORITY ADJUSTMENT OF AN INTERRUPT IN A DATA PROCESSOR

FIELD OF THE INVENTION

This invention relates generally to data processors, and more particularly, to interrupt mechanisms for generating a prioritized processing interrupt signal used by data processors.

BACKGROUND OF THE INVENTION

A data processor typically executes program instructions sequentially. Often, however, either internal requests from within the data processor or external requests from devices peripheral to the data processor necessitate the execution of interrupt service routines. Interrupt service routines are sets of instructions which enable the data processor to respond appropriately to these internal or external requests. To allow for execution of the interrupt service routine, the interrupt request signals are asserted and normal operation of the data processor is temporarily suspended. Commonly, the interrupt request signal may be identified by an assigned priority level. Therefore, if several interrupt request signals are asserted simultaneously, the signal with the highest priority will be serviced first. This type of prioritization system generally results in a more efficient data processor which is able to quickly service interrupt requests which are vital for operation before processing those interrupt requests which are not as significant. However, the time necessary to service each of the interrupt request signals increases in such a system since the priority levels of each of the interrupt requests must be compared to determine the highest priority. Current technology permits the priority of the interrupt request signals to be determined by hardware implementations, software programs or a system involving both. In many cases, the established priority of an interrupt request signal may be adjusted to reflect the needs of a user's system. Typically, an interrupt request signal with a lower priority is adjusted to have the highest priority and is serviced first. An example of a data processor having an adjustable interrupt priority is the MC68HC11 of data processors sold by Motorola, Inc.

In known data processing systems, an interrupt request signal is not identified as having been adjusted. Often, it is desirable for the user to adjust the priority of a signal to a higher level without changing the interrupt request signal with the highest priority. Additionally, the user may need to determine whether or not an interrupt request signal has been adjusted to a higher level, or has simply been asserted in the general operation of the data processor. Existing data processing systems commonly use software routines which force every potential interrupt source to be investigated to determine if an adjustment in interrupt prioritization occurred. The time required to perform this function may significantly impact a system's overhead.

SUMMARY OF THE INVENTION

The previously mentioned needs are fulfilled with the present invention. Accordingly, there is provided, in one form, a data processing system having an interrupt mechanism with an apparatus for variably adjusting a priority value of an interrupt signal. The apparatus comprises a plurality of prioritized modules each of which selectively provides an interrupt source signal. A first logic portion is coupled to the plurality of prioritized modules for receiving each interrupt source signal and receives an adjust signal which selectively modifies an interrupt priority of a predetermined one of the prioritized modules. The first logic portion provides an adjust enable signal which indicates when the predetermined prioritized module provides the interrupt source signal. A second logic portion is coupled to the plurality of prioritized modules and to the output signal of the first logic portion. The second logic portion provides a priority interrupt signal which either identifies a highest prioritized module providing an interrupt source signal or if an adjustment in the interrupt priority of the modules was made. The data processing system uses the priority interrupt signal to identify the highest prioritized module if the priority interrupt signal indicates that an adjustment in interrupt priority was made.

These and other features, and advantages, will be more clearly understood from the following detailed description taken in conjunction with the accompanying drawings.

DETAILED DESCRIPTION OF A PREFERRED EMBODIMENT

Figure 1:
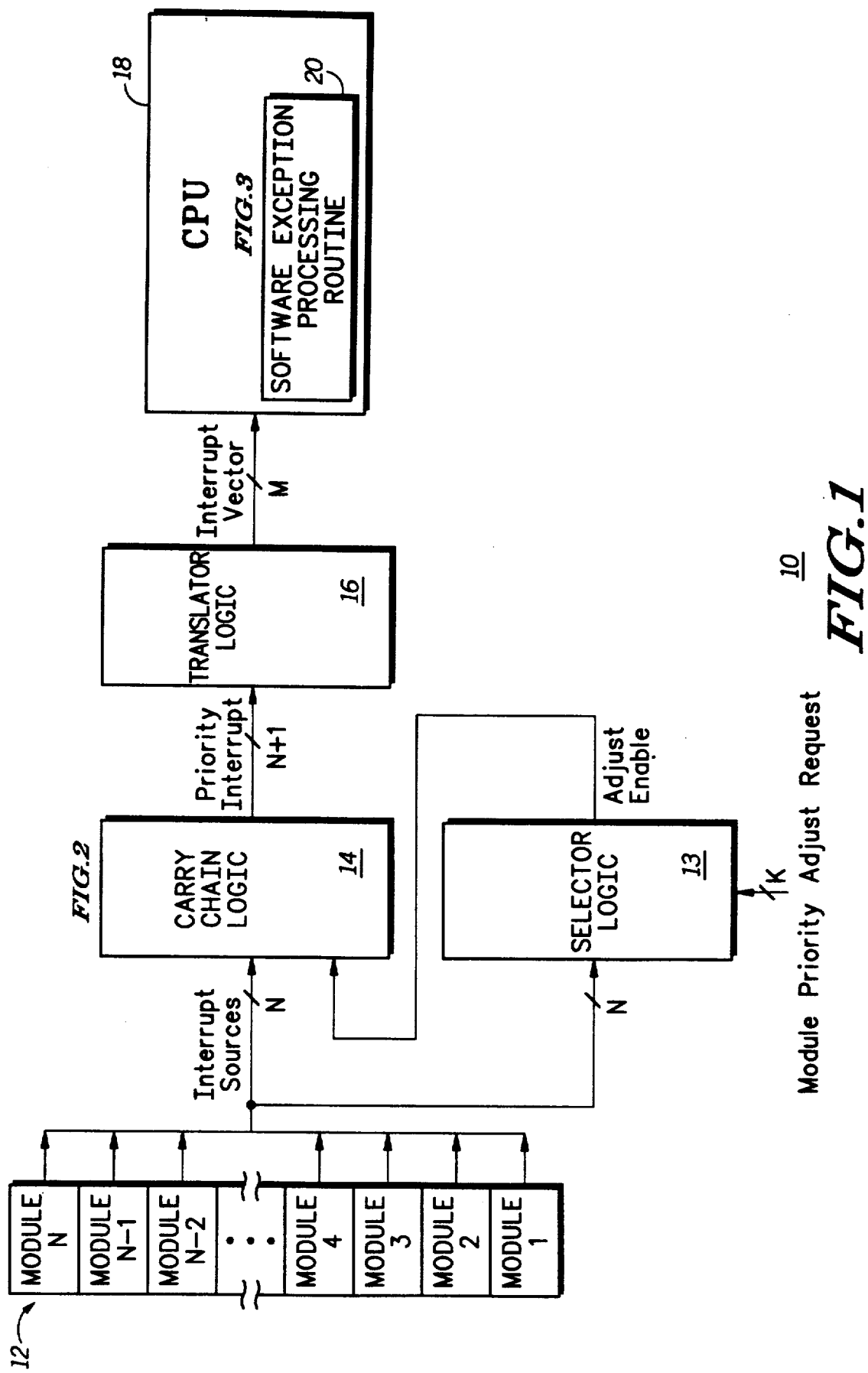
FIG. 1 illustrates in block diagram form an interrupt mechanism in accordance with the present invention.

Illustrated in FIG. 1 is a block diagram of a data processor interrupt mechanism 10 comprised generally of a plurality of N modules 12, where N is an integer, selector logic 13, carry chain logic 14, translator logic 16, and a central processing unit (CPU) 18 having a software exception processing routine 20.

In the interrupt mechanism 10, the modules 12 provide N interrupt source signals collectively labeled "Interrupt Sources", which are connected to a first input of each of the carry chain logic 14 and the selector logic 13 via an N-bit wide communications bus. An encoded signal labeled "Module Priority Adjust Request" is connected to a second input of selector logic 13 via a second communications bus which is K bits wide, where K is an integer. An output of selector logic 13 is a signal labelled "Adjust Enable" and is connected to a control input of carry chain logic 14. An output of carry chain logic 14 is a signal labelled "Priority Interrupt" having (N+1) bits and is connected to an input of the translator logic 16 by a third communications bus. An output of translator logic 16 is a signal labelled "Interrupt Vector" having M bits, where M is an integer, which is connected to the software exception processing routine 20 within the CPU 18.

In the illustrated form, interrupt mechanism 10 functions to provide a prioritized data processing interrupt mechanism which is user adjustable. There are a variety of applications for such an interrupt mechanism. One application is in the area of automobile systems control. In this application, the plurality of modules 12 may represent the systems monitored in an automobile in a prioritized order. Assume that the module with the lowest number represents the system function with the highest interrupt source priority. For example, a signal to perform a brake function might be assigned the highest interrupt source priority (one), with the sequential firing of four pistons in the engine being assigned the next four interrupt source priority levels (two through five). At any point in time in the operation of the automobile, one or more interrupt source signals may be coupled to the CPU. When more than one interrupt source signal is asserted, the interrupt mechanism must recognize a priority level of each signal and service the highest prioritized interrupt source signal. While the automobile is operating and a braking situation is not encountered, the sequential firing of the pistons is necessary for proper operation of the engine. The CPU 18 of the automobile's control systems must be interrupted each time one of the four pistons should be fired. Therefore, if the second piston has fired, the third piston should be fired next. The interrupt source signal associated with the third piston (priority level four) should be subsequently serviced. If the priority level four interrupt source signal has the highest priority level asserted, the carry chain logic 14 identifies that signal as the priority interrupt signal. An appropriate interrupt vector is then provided to CPU 18.

Assume that at least one concurrent interrupt source signal having a higher priority level than level four (i.e. lower numbered module) is also asserted. A software program (not shown) selectively provides the module priority adjust request signal to control the automobile system in a predetermined manner. The module priority adjust request signal contains an encoded value identifying a module which should have the priority level raised. The software program which provides the module priority adjust request signal is structured to insure that certain automobile functions are not interrupted. In this example, the software program is structured to insure that the CPU permits the firing of the third piston before servicing any higher interrupt source signal. The software program which provides the module priority adjust request signal either may or may not be implemented in the software exception processing routine 20. In response to receiving the module priority adjust request signal, selector logic 13 asserts the adjust enable signal. When the adjust enable signal is asserted, the carry chain logic 14 provides an encoded priority interrupt signal which indicates that the priority of an interrupt source has been adjusted. The translator logic 16 translates or assigns the priority interrupt signal a predetermined interrupt vector signal. The interrupt vector signal is sent to software exception processing routine 20 in the CPU 18 of the automobile system. At that point, if the priority level of the third piston was not adjusted, the software exception processing routine 20 enables the appropriate interrupt service routine to be activated and the third piston fires. If the priority level of the third piston was adjusted, the software exception processing routine tests the interrupt vector to perform a brake function. In this example, if the interrupt source signal to perform the higher prioritized brake function has been asserted, the software exception processing routine 20 overrides the piston firing function to perform a brake function for the automobile. If the interrupt source signal to perform a brake function has not been asserted as determined by exception processing routine 20, then the appropriate interrupt service routine is asserted and the third piston fires.

As illustrated in FIG. 1, the plurality of N modules 12 represents either internal interrupt sources from within the data processing system which uses interrupt mechanism 10 or external interrupt sources peripheral to the data processing system. Each of the modules is assigned a predetermined priority level according to the specifications of the user's system. Selector logic 13 may be implemented with standard logic which compares the interrupt source signals to a module priority adjust request signal. The module priority adjust request signal indicates that the priority level of a specified module should be adjusted to reflect the needs of the system's user. It should be well understood that the determination as to which module should be adjusted in priority is made through either a software program (not shown) or a hardware implementation (not shown) external to the interrupt mechanism shown in FIG. 1. If the specified module priority adjust request signal corresponds to one of the active interrupt source signals, the adjust enable signal is asserted. If the specified module priority adjust signal does not correspond to one of the active interrupt source signals, the adjust enable signal is not asserted. The adjust enable signal is output to the carry chain logic 14.

Figure 2:
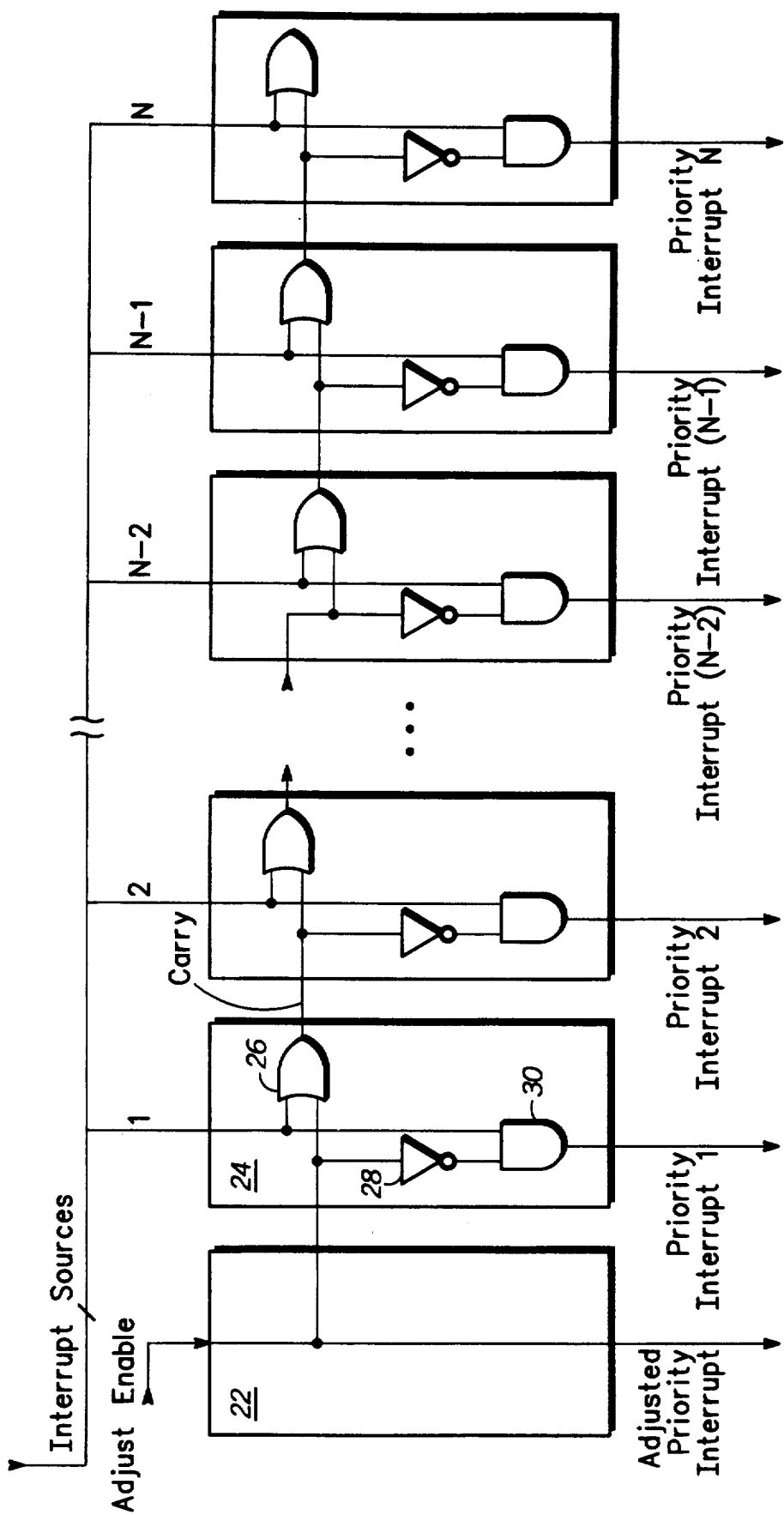
FIG. 2 illustrates in logic diagram form carry chain logic of the interrupt mechanism of FIG. 1.

Illustrated in FIG. 2 is a logic diagram of the carry chain logic 14 of FIG. 1 and is generally comprised of a plurality of prioritized (N+1) logic portions such as a first logic portion 22 and a second logic portion 24, each of which generates a priority interrupt signal. The adjust enable signal provides an input to logic portion 22 which is comprised of a single node. The adjust enable signal is asigned the highest priority interrupt signal when it is asserted. If the adjust enable signal is not asserted, the interrupt source with the highest priority is assigned the appropriate priority interrupt signal. The priority interrupt signal is output from the carry chain logic 14.

Logic portion 24 is generally comprised of an OR gate 26, an inverter 28, and an AND gate 30. All other lower ranked logic portions of carry chain logic 14 also each have an OR gate, an inverter and an AND gate. The adjust enable signal from logic portion 22 provides an input to both a first input of OR gate 26 and an input of inverter 30. The interrupt source signal provides an input to both a second input of the OR gate 26 and a first input of the AND gate 30. An output of inverter 28 is connected to a second input of AND gate 30. An output of the OR gate 26, labelled "Carry", provides a first input to an OR gate and an inverter in an immediately lower prioritized logic portion. An output of AND gate 30 provides a bit of predetermined rank of the (N+1) bit encoded priority interrupt signal. The carry chain logic 14 identifies an interrupt source signal having the highest priority level by asserting only one bit of the priority interrupt signal. For example, if the interrupt source signal associated with module one is asserted, the priority interrupt one signal is asserted. The carry output of OR gate 26 is also asserted and is carry propagated in chain fashion thru all other lower prioritized logic portions to force the output of each logic portion to not be asserted. If the priority of an interrupt source signal has been adjusted, the priority interrupt signal only identifies that the signal was adjusted, and not the actual priority of the signal. The translator logic 16 comprises standard logic circuitry for translating or assigning the (N+1) bit priority interrupt signal a predetermined interrupt vector signal having M bits. CPU 18 uses the M bit interrupt vector signal to identify the highest prioritized interrupt source signal or whether a priority adjustment was made to an interrupt source signal.

Figure 3:
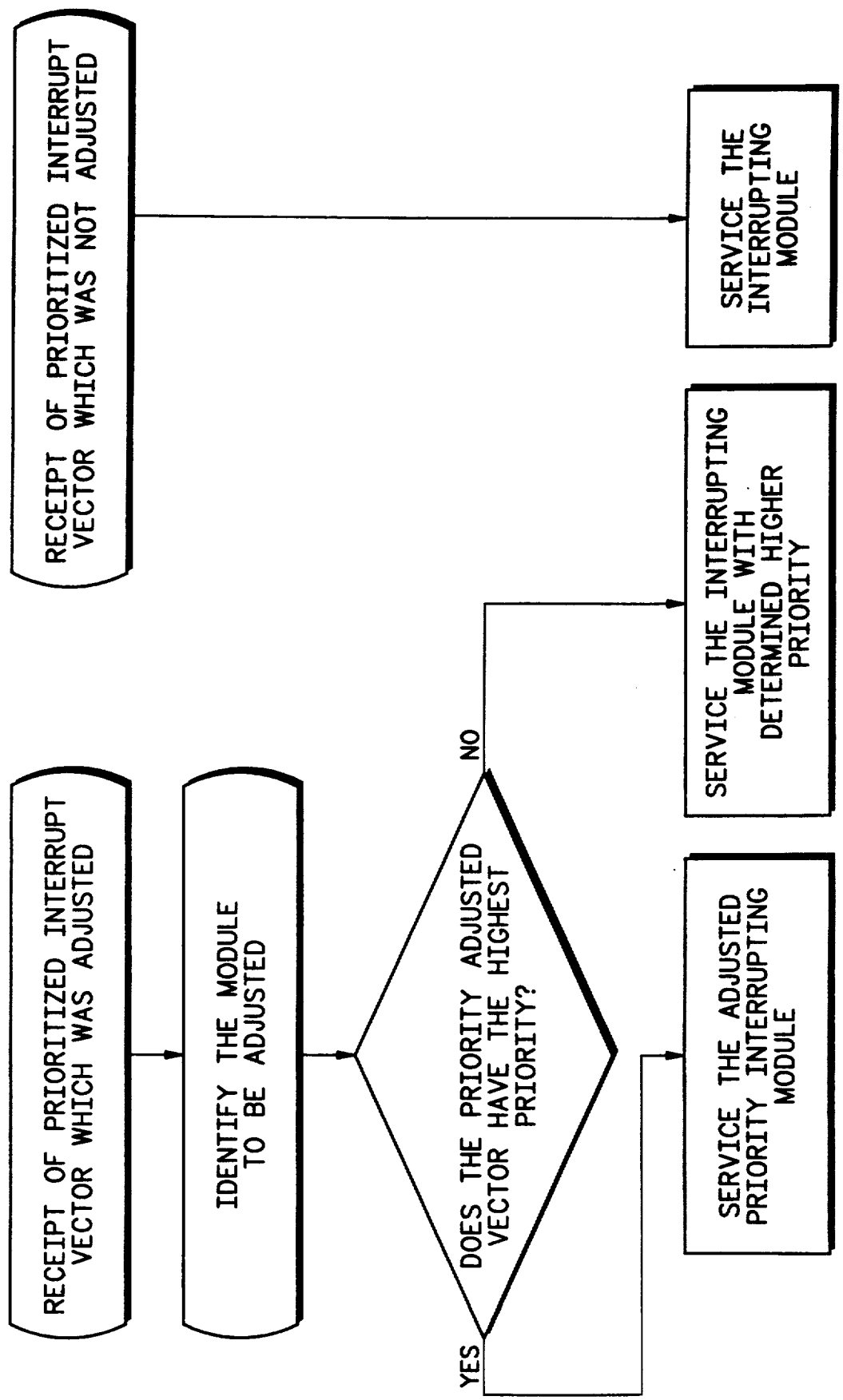
FIG. 3 illustrates in flow chart form a software exception processing routine implemented by the interrupt mechanism of FIG. 1.

Illustrated in FIG. 3 is a flow chart diagram of the software exception processing routine 20 which occurs after the interrupt vector signal is input to the CPU 18. The flow chart illustrates how the data processing system having the interrupt mechanism of the present invention uses the priority interrupt signal to identify the highest prioritized module if the priority interrupt signal indicates that an adjustment in interrupt priority was made. When a prioritized interrupt vector which was adjusted is input to the CPU 18, the module which should be adjusted is identified through a user software program which is the software exception processing routine 20. After a priority adjusted interrupting module is identified, the adjusted prioritized interrupt vector is tested by routine 20 to determine if a user has programmed CPU 18 to allow the adjusted interrupting module to retain the adjusted priority. If the adjusted prioritized interrupt vector is verfied by routine 20 as the vector with the highest priority, the adjusted priority interrupting module should be serviced. If the user has defined the data processing system so that the adjusted prioritized interrupt vector does not have the highest priority level, the software exception processing routine 20 indicates that the interrupting module which was determined to have a higher priority should be serviced. If a prioritized interrupt vector which was not adjusted is received, the software exception processing routine 20 allows the interrupting module to be serviced.

It should be well understood that interrupt mechanisms are essential to the operation of data processors. The need to provide prioritized processing interrupt signals in a timely manner is a concern of many systems designs. The interrupt mechanism described herein provides an effective and unique solution to generate the response to prioritized interrupt signals more quickly than conventional designs. The user identifies and adjusts the interrupt source signal which should have the highest priority by using either a software program (not shown) or a hardware implementation (not shown). When the interrupt source signal assigned the highest priority is asserted, the present invention identifies whether an interrupt source signal was adjusted before the interrupt vector is provided to the CPU. Additionally, the CPU does not have to individually investigate each system module to acquire additional information related to the priority adjustment. As a result, the speed with which the CPU 18 services the interrupt source signal is increased. The priority interrupt signal is encoded by assigning a unique value to an adjusted interrupt source signal. That unique priority interrupt signal may then be used in a variety of operations which shorten the time necessary to process interrupt requests, as well as allow an interrupt source to have a higher priority level than some of the interrupt source signals, but not all. In other words, a user may variably adjust the priority of an interrupt request without making the adjusted priority assume the highest priority in the interrupt mechanism.

By now it should be apparent that there has been provided an interrupt mechanism which generates a prioritized processing interrupt signal used by data processors. There are many additional configurations for implementing the invention described above. The specific bit sizes are provided by way of example only. For example, the module priority adjust request signal input to the selector logic 13 could range in size from a single bit to any other encoded bit size. As well, the carry chain logic 14 could be replaced by a programmable logic array (PLA). In such an implementation, the PLA would be programmed to perform the same function described above as the carry chain logic 14 performs. The translator logic 16 could be removed from the data processor 10. Also, translator logic 16 could be replaced by either a software program or other hardware implementations. The software exception processing routine 20 could also be implemented in a variety of ways. The flow chart diagram illustrated in FIG. 3 represents only one manner in which the invention could be used. The function of software exception processing routine 20 could also be implemented by hardware.

While there have been described herein the principles of the invention, it is to clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:
1. A digital data processor comprising:
a central processing unit having an input;
a plurality of modules, each of the plurality of modules having an output for providing a priority level signal specifying a priority level of the module;
first logic means having a first input coupled to the output of each of the plurality of modules and having a second input for receiving a module priority adjust signal which specifies a particular priority level, the first logic means having an output for providing an adjust enable signal if the first input receives a priority level signal from one of the plurality of modules which corresponds to the particular priority level specified by the module priority adjust signal; and
second logic means having a first input coupled to the output of each of the plurality of modules and a second input coupled to the output of the first logic means, the second logic means having an output for providing an interrupt vector to the input of the central processing unit, the interrupt vector corresponding uniquely to the priority level of a one of the plurality of modules which is presently requesting an interrupt and which has a highest priority level of all the modules presently requesting an interrupt when the adjust enable signal is not asserted, the interrupt vector indicating that the priority level of one of the plurality of modules has been adjusted when the adjust enable signal is asserted, the interrupt vector not corresponding to the priority level of any of the plurality of modules when the adjust enable signal is asserted.

2. The digital data processor of claim 1 wherein at least one of the plurality of modules provides the priority level signal specifying the priority level of the module in response to an input provided by a user of the digital data processor.

3. The digital data processor of claim 1 wherein the second logic means comprises:
a carry chain circuit having a first input coupled to the output of each of the plurality of modules for receiving the priority level signal and a second input coupled to the output of the first logic means for receiving the adjust enable signal, the carry chain circuit having an output for providing a priority interrupt signal, the priority interrupt signal indicating the highest level of all the modules presently requesting the interrupt if the adjust enable signal is not asserted, the priority interrupt signal indicating the priority level of one of the plurality of modules has been adjusted if the adjust enable signal is asserted; and a translation circuit having an input coupled to the carry chain circuit for receiving the priority interrupt signal, the translation circuit encoding the priority interrupt signal to form the interrupt vector.

4. The digital data processor of claim 1 wherein the adjust enable signal is asserted when the particular priority level specified by the module priority adjust signal is equal to the priority level signal received from the one of the plurality of modules.

5. A method for executing an interrupt operation in a digital data processor, comprising the steps of:

receiving a plurality of priority level signals, each of the plurality of priority level signals specifying a priority level of a corresponding one of a plurality of modules;

comparing each of the plurality of priority level signals with a particular module priority adjust value to determine if the priority level of one of the plurality of modules should be adjusted;

asserting a priority adjust enable signal if the one of the plurality of priority level signals should be adjusted; and providing an interrupt vector, the interrupt vector indicating that the priority level of one of the plurality of priority level signals should be adjusted when the priority adjust enable signal is asserted and the interrupt vector not indicating the priority level of any of the plurality of modules when the priority adjust enable signal is asserted, the interrupt vector indicating a highest priority level of all of the plurality of modules presently requesting an interrupt when the priority adjust enable signal is negated.

6. The method of claim 5 further comprising the steps of:

identifying the one of the plurality of modules which should be adjusted if the priority adjust enable signal is asserted;

determining if a priority level corresponding to the one of the plurality of modules which should be adjusted has a highest priority level; and servicing the one of the plurality of modules which should be adjusted if the priority level corresponding to the one of the plurality of modules which should be adjusted is the highest priority level and servicing another one of the plurality of modules having the highest priority level if the priority level corresponding to the one of the plurality of modules which should be adjusted is not the highest priority level.

7. The method of claim 5 further comprising the step of servicing the one of the plurality of modules which is presently requesting an interrupt and which has the highest priority level of all the modules presently requesting an interrupt if the priority adjust enable signal is negated.

8. The method of claim 5 wherein the adjust enable signal is asserted when the particular priority level identified by the module priority adjust signal is equal to the priority level signal received from the one of the plurality of modules.

9. A digital data processor, comprising:

a central processing unit, the central processing unit having a software exception processing routine;

a plurality of modules, each of the plurality of modules having an output for providing a priority level signal identifying a priority level of the module;

first logic means having a first input coupled to the output of each of the plurality of modules and having a second input for receiving a module priority adjust signal which identifies a particular priority level, the first logic means having an output for providing an adjust enable signal if the first input receives a priority level signal from one of the plurality of modules which corresponds to the particular priority level identified by the module priority adjust signal;

a carry chain circuit having a first input coupled to the output of each of the plurality of modules for receiving the priority level signal and a second input coupled to the output of the first logic means for receiving the adjust enable signal, the carry chain circuit having an output for providing a priority interrupt signal, the priority interrupt signal indicating the highest level of all the modules presently requesting the interrupt if the adjust enable signal is not asserted, the priority interrupt signal indicating the priority level of one of the plurality of modules has been adjusted if the adjust enable signal is asserted; and a translation circuit having an input coupled to the carry chain circuit for receiving the priority interrupt signal, the translation circuit encoding the priority interrupt signal to form an interrupt vector.

10. The digital data processor of claim 9 wherein the interrupt vector indicates that the priority level of one of the plurality of modules has been adjusted if the first logic means is presently providing the adjust enable signal.

11. The digital data processor of claim 9 wherein at least one of the plurality of modules provides the priority level signal identifying the priority level of the module in response to an input provided by a user of the digital data processor.

12. The digital data processor of claim 9 wherein the module priority adjust signal is provided by the software exception processing routine in the central processing unit.

13. The digital data processor of claim 9 wherein the adjust enable signal is asserted when the particular priority level identified by the module priority adjust signal is equal to the priority level signal received from the one of the plurality of modules.

* * * * *